United States Patent [19]

Donohue et al.

[11] Patent Number: 4,528,080

[45] Date of Patent: Jul. 9, 1985

[54] PHOTOCHEMICAL METHOD FOR THE SEPARATION OF MIXTURES OF XENON AND KRYPTON

[75] Inventors: Terence Donohue, Alexandria, Va.; Christine E. Geosling, Moorpark, Calif.

[73] Assignee: The United States of America as represented by the Secretary of the Navy, Washington, D.C.

[21] Appl. No.: 605,966

[22] Filed: May 1, 1984

[51] Int. Cl.³ .............................................. B01J 19/12
[52] U.S. Cl. ............................................ 204/157.1 R
[58] Field of Search .................. 204/157.1 R, 157.1 P, 204/157.1 L

[56] References Cited

U.S. PATENT DOCUMENTS

| | | | |
|---|---|---|---|
| 2,705,219 | 3/1955 | Heiskell et al. | 204/157.1 R |
| 3,185,548 | 5/1965 | Fields et al. | 423/489 |
| 3,377,136 | 4/1968 | Morrow | 423/489 |
| 4,045,316 | 8/1977 | Legan | 204/157.1 P |
| 4,158,614 | 6/1979 | Schuster et al. | 204/157.1 L |

*Primary Examiner*—Howard S. Williams
*Attorney, Agent, or Firm*—Robert F. Beers; William T. Ellis; Barry A. Edelberg

[57] ABSTRACT

Xenon is isolated from a gaseous mixture containing xenon and krypton. Fluorine is added to the mixture and the resulting mixture then irradiated with light of about 250–370 nm to form crystals of xenon difluoride. The unreacted gases are removed and the remaining crystals are decomposed, typically by thermal means, to yield xenon and fluorine gas. The xenon gas may be easily isolated by conventional means from the fluorine gas. Krypton may also be easily isolated from the remaining gases by conventional means. The process is particularly applicable to the treatment of offgases from a nuclear reactor or reprocessing plant.

20 Claims, No Drawings

PHOTOCHEMICAL METHOD FOR THE SEPARATION OF MIXTURES OF XENON AND KRYPTON

BACKGROUND OF THE INVENTION

This invention relates generally to processes for the separation of noble gases and more specifically to processes for the separation of xenon from a gaseous mixture containing krypton.

There is increasing interest in new methods for noble gas separation for reasons of both cost and safety. The prevalent separation method for xenon and krypton is cryogenic distillation generally as a byproduct from the manufacture of liquid air. This process, while well developed and reliable, is relatively energy intensive. Another source for these noble gases may become available in the future, as the products from nuclear fission, found as offgases from either nuclear reactors or reprocessing plants. A number of novel rare gas separation methods have been recently developed to both take advantage of this new source and also reduce or eliminate the radioactive hazards found with these offgases.

The separation costs arise primarily from the thermodynamically inefficient production of low temperatures required for separation and near liquid nitrogen temperatures ($-196°$ C.). While the amount of rare gases separated constitute only a very small fraction of the volume processed by a commercial liquid air plant, noble gas purity requirements involve extensive amounts of distillation. Elimination of this feature, as found in the room temperature process described here, would reduce processing costs. Furthermore, a safety hazard is found when the cryogenic process is used with the gaseous products from spent nuclear fuel. Radiolysis of the air and water always present produces ozone, which becomes explosive when condensed as a liquid at temperatures below about $-120°$ C. The incentives for developing a noncryogenic separation technique are thus clear.

Of the isotopes of Xe and Kr produced by nuclear fission, only one, $^{85}$Kr, has a significant half-life (of about 10 years). Furthermore, krypton constitutes only 6.5% of the total rare gases, so that a simple elemental separation process is sufficient to produce xenon free of any radioactive isotopes. Further photochemical enrichment of this isotope is possible but not necessary for most applications.

The discovery of the first noble gas compounds was soon followed by the first reports that some of these compounds could be synthesized photochemically. Xenon difluoride ($XeF_2$), xenon tetrafluoride ($XeF_4$) and xenon hexafluoride ($XeF_6$) can be made thermally from Xe and $F_2$; however, temperatures of about 250° C. are necessary for establishment of equilibrium on a reasonable time scale. It is relatively straightforward to make $XeF_2$ photochemically, but photochemical production of $KrF_2$ requires quite severe conditions such as in the cryogenic liquid or solid states. This difference in stabilities between the two difluorides is the basis for the separation technique presented here.

Xenon difluoride is produced when a mixture of xenon and fluorine is irradiated in the ultraviolet (UV), into the absorption band of the fluorine molecule. This band is relatively weak ($\epsilon$ of about 3.0 $l.mol^{-1} cm^{-1}$) and broad, peaking at 285 nm, and photolysis in this region results in the production of fluorine atoms. Any photolytic source can be used as long as the wavelength is appropriate, from about 250 to 350 nm. It is not necessary that the mechanism resulting in $XeF_2$ production be totally understood. Indeed, some of the details have yet to be fully explained. The significant feature is that a photochemical process involving the rare gases can be made selective for xenon, where the products are molecular and can be readily separated from reagents.

OBJECTS OF THE INVENTION

It is an object of this invention to provide an inexpensive, highly efficient method for the separation of xenon from a gaseous mixture containing krypton.

It is another object of this invention to provide a process for the separation of xenon from a gaseous mixture containing krypton which does not require extensive distillation.

It is a further object of this invention to provide a non-cryogenic process for the separation of xenon from a mixture of gases containing krypton.

SUMMARY OF THE INVENTION

These and other objects are achieved by irradiating a mixture of gases containing xenon, krypton and fluorine with light having a wavelength of about 250-370 nm. The xenon reacts with the fluorine to form $XeF_2$. The krypton does not react with fluorine to form a stable product. $XeF_2$ crystals are condensed out and separated from the gaseous mixture. The $XeF_2$ crystals are then decomposed, forming xenon and fluorine. The xenon and fluorine are then separated by conventional means.

DETAILED DESCRIPTION OF THE PREFERRED EMBODIMENTS

To carry out the process of this invention, a mixture of gases containing xenon and krypton is admitted into a vessel. Fluorine is then added to the vessel, and the mixture then irradiated with light having a wavelength of about 250-370 nm to form crystals of $XeF_2$. The unreacted gaseous mixture remaining, containing krypton and excess fluorine, is then removed and the $XeF_2$ decomposed to form xenon and fluorine. The xenon may then be isolated from the fluorine by conventional means.

All metal apparatus (e.g., vacuum lines) in which fluorine is handled should be passivated by well known means.

The gases used in this process may be admitted into the vessel by any known means. For the sake of convenience, the gases used are most easily admitted into the vessels by condensation or expansion.

The irradiation assisted reaction between xenon and fluorine may be carried out at almost any temperature at which krypton and xenon remain gaseous. Nevertheless, the extreme reactivity of fluorine and the resultant safety hazards militate against carrying out the reaction at high temperatures. Preferably, if about 3 or more torr of xenon are present, the reaction is carried out at about 10° C. Smaller amounts of xenon in the mixture may require somewhat lower temperatures to result in an optimum yield. For example, gaseous mixtures containing fluorine having about 0.1 torr or less xenon are preferably reacted at about $-10°$ C. Lower than optimum temperatures may somewhat increase the yield, but will result in a wastefully more expensive process. In applications where a radioactive material is present and the formation of ozone is possible, the reaction temperature should be kept above $-120°$ C. to prevent condensation of ozone.

A slight stoichiometric excess of fluorine is preferably present to insure optimum yield and complete removal of xenon from the mixture. Preferably, about 110–150 percent of the fluorine required to react with the xenon present in the mixture to form $XeF_2$ is present during irradiation. The presence of other gases in the mixture which react with fluorine under the conditions used (such as radon) require additional fluorine to provide for an optimum yield of xenon. If all of the xenon has been reacted, krypton may be easily separated from the remaining unreacted gases by conventional means.

The process of this invention may be carried out at almost any pressure. Nevertheless, considerations of safety and cost render a range of about 10 torr (the condensation pressure of $XeF_2$ at the preferred temperature) to about atmospheric pressure preferable.

Additionally, the process of this invention may be carried out, without interference, in the presence of contaminants typically found in mixtures of xenon and krypton obtained as offgases from a nuclear reactor or reprocessing plant. Typical contaminants include air and NO.

The vessel in which the irradiation assisted reaction occurs, a photolysis cell having at least one window through which the photoactivating light used may pass, preferably has salt windows, since quartz is reactive and tends to corrode. Useful salts include NaCl, KCl and MgCl. Most preferably, however, the salt window is made of a fluoride, such as MgF, NaF and $CaF_2$.

Any light source having a wavelength of about 250–370 nm and preferably 250–350 nm may be used in the process of this invention. Typical light sources include a mercury lamp and a pulsed or continuous laser. The power of the light source determines the amount of gas that may be processed at any one time.

The process of this invention is suitable for either batch or continuous processing. In a typical continuous process, a stream of the gaseous mixture to be processed would be mixed with fluorine gas and continuously flowed through a reaction chamber having water-cooled sidewalls past a light source. The $XeF_2$ crystals thus formed could then be condensed upon the water-cooled side walls of the reaction chamber and the crystals continuously scraped therefrom by a rotating blade and expelled from the vessel by centrifugal force. Alternatively, reagent gases may be mixed and flowed through a tube, forming $XeF_2$ suspended in the gas. The $XeF_2$ may be removed by a centrifugal separator. A 10 kW mercury lamp would be an adequate light source for processing the entire offgas from a typical nuclear reprocessing plant.

The time of exposure to irradiation determines the yield and the separation factor. Increasing the time of exposure increases the yield but lowers the separation factor.

EXAMPLES

Having described the invention in general, the following examples are being given to illustrate the principles of the invention and are not intended to limit the scope of the invention in any manner.

The xenon and krypton used in these experiments were 99.995% pure from Air Products. The fluorine was 98% pure from Matheson and the nitric oxide 99.0% pure from Matheson.

The gases were handled in an all-metal vacuum lines passivated with fluorine. Removable traps were used to transfer samples to the mass spectrometer for analysis.

Two photolysis cells were used. A quartz cell with fused quartz windows was employed in the initial experiments, but production of $SiF_4$ by action of fluorine on the cell walls was found to interfere with the mass spectral product analysis. For most of the experiments, a stainless steel cell with $CaF_2$ UV quality windows was used. This cell was also passivated with fluorine before use.

In a typical experiment about 150 torr of krypton and 150 torr of xenon were admitted to a holding trap and an analysis trap. The analysis trap was then closed and taken to the mass spectrometer (Finnigan Model 3100) for a reference spectrum to allow exact determination of the Xe/Kr ratio. The remainder of the rare gas mixture was then condensed into the photolysis cell by lowering the temperature of $-196°$ C. using liquid nitrogen. About 250 torr of fluorine was then added to the photolysis cell which was then sealed and removed for photolysis. The pressures of reagents were calculated to give a small excess of fluorine over that required for complete conversion to $XeF_2$.

The photolysis cell was maintained at room temperature with its cold finger immersed in a Dry Ice TM /2-propanol slush at $-78°$ C. and irradiated with either a 150-W xenon lamp (Oriel), a 500-W medium-pressure mercury lamp (Oriel), or a XeF laser (351 nm; Lumonics Model 261, operated at an average power of 2 W). As irradiation proceeded, fine crystals of $XeF_2$ were observed to condense on the inside of the cell near the mouth of the cold finger. No observable or measureable amounts of $KrF_2$ were ever isolated in any experiment, not surprising considering the poor stability of this compound. In other experiments, $XeF_2$ was found to condense at temperatures as warm as 10° C., but colder temperatures were used to ensure maximum product yields.

After photolysis, the cell was reattached to the vacuum line and the unreacted fluorine pumped off at $-196°$ C. A Dry Ice TM /2-propanol slush was then placed on the cell, and the unreacted Xe and Kr were condensed into another trap at $-196°$ C. to allow mass spectral analysis of the product yield. Cryogenic temperatures were used here for ease of product analyses and complete material recovery in a single stage "proof of principle" set of experiments. The product $XeF_2$ crystals were then subjected to three freeze/pump/-thaw cycles between $-78°$ and 25° C., then transferred to the analysis trap, and finally gently heated to decompose the compound into Xe, and Kr and $F_2$ for mass spectral analysis. Ths trap contained clean copper wool to remove the fluorine produced during this process.

The separation factor, $\beta$, was calculated from the mass spectral peak heights of several of the Xe and Kr isotopes according to the equation $$\beta = \frac{Xe/Kr \text{ (products)}}{Xe/Kr \text{ (reactants)}} \quad (1)$$

where Xe/Kr (products) is the ratio of xenon and krypton obtained from decomposed product crystals after all volatiles have been removed (see below). Xe/Kr (reactants) is simply the initial ratio of reactant gases. The $^{84}Kr$ peak was used exclusively in the calculations, since it was found to be least affected by impurity peaks in the mass spectrum. However, there was always enough background interferences to preclude exact measurement of the Kr peak intensities; thus, all measurements were lower bound estimates. However, there were no background interferences whatsoever in the region where Xe peaks were found, and the measured xenon isotope peak intensities always reflected the natural abundance isotope ratio. Calculations using any of the xenon peaks gave essentially similar separation factors, but the $^{129}$Xe peak, among the most intense, was generally used in the calculations.

The yield was calculated from the amounts of unreacted xenon and krypton remaining after photolysis according to $$\text{yield} = \left(1 - \frac{\text{Xe/Kr(unreacted)}}{\text{Xe/Kr(reactants)}}\right) 100\% \quad (2)$$

where Xe/Kr(unreacted) is the ratio of xenon and krypton remaining volatile over product crystals after irradiation (see below). Xe/Kr(reactants) is as previously defined. It was possible to obtain yields near 100% with long irradiation times, but at the expense of small drops in $\beta$. This is most likely due to inclusion of Kr (or, less likely, KrF$_2$) in the product XeF$_2$ during crystallization.

The separation factors and yields for photochemical separation of xenon and krypton are given in Table I. The yield rises linearly with photolysis time and then levels off as 100% reaction is approached. The separation factors, however, do not give such a monotonic trend, except possibly that larger extents of photolysis tend to give poorer separations. This could possibly be due to the relative difficulty of degasing the larger amounts of material deposited in the longer photolysis experiments. In most cases, the magnitude of the separation factor obtained was dependent upon the ability to distinguish and measure very small product Kr peaks among mass spectral background and impurities near the limit of sensitivity of the mass spectrometer. These factors varied from experiment to experiment. Thus, actual separations are always larger than those listed in Table I.

TABLE I

Separation Factors and Yields for Xe/Kr Separations

| irrad. time, h | run no. | source | $\beta$ | yield % |
|---|---|---|---|---|
| 1.0 | 11 | Hg lamp | 1100 | 34 |
| 1.5 | 12 | Hg lamp | 1300 | 50 |
| 1.5 | 7 | Hg lamp | 1700 | e |
| 2.0 | 10 | Hg lamp | 350 | 74 |
| 4.0 | 9 | Hg lamp | 100 | 98.7 |
| 6.0 | 13 | Hg lamp | 500 | 99.8 |
| 1.25[a] | 2 | Hg lamp | 300 | e |
| 3.0[a] | 1 | Xe lamp | 7 | e |
| 4.0[b] | 14 | Hg lamp | 1000 | 98 |
| 4.0[c] | 15 | Hg lamp | 7000 | 64 |
| 1.0 | 8 | XeF laser[d] | 300 | 7 |

[a]Quartz photolysis cell.
[b]50 torr of room air added.
[c]50 torr of NO added.
[d]351 nm.
[e]The yield was not measured in these experiments.

Runs 14 and 15 were carried out with added impurity gases, air and NO, respectively, since these are the most likely impurities encountered in nuclear reactor off-gases. Added air had essentially no effect on the yield or $\beta$. Added NO, however, increased the separation factor greatly while decreasing the yield. There were no new peaks in the product mass spectrum of the sample with air; however, the product spectra of the sample with NO contained significant peaks corresponding to both N$_2$O and NO$_2$. These results show that the photochemical separation method can be successfully employed without the need for preliminary separation steps to eliminate non-noble gas constituents. Separation factors greater than 1000 have been achieved, and product yields greater than 99% are possible, with some reduction in product purities. The conditions used here, however, are not optimum for a full-scale separation process. Even though Kr is only 0.02% by volume of a reprocessing offgas stream and Xe constitutes 2.1%, recovery of F$_2$, use of several cascaded stages and a continuously flowing system can improve efficiencies markedly. Larger mercury lamps can be made to operate more efficiently than those used in the present system. In fact, a single 10 kW Hg lamp would be an adequate photolytic source for processing the entire off-gases from a typical nuclear reprocessing plant. The costs involved in cooling are small, since XeF$_2$ can be condensed at near room temperature. The process can be operated at or near atmospheric pressure, which can give large throughputs while avoiding the risks of operating at higher pressures.

Further details and discussion may be found in Geosling, C. E. and Donohue, T., "Photochemical Separation of Xenon and Krypton," Environ. Sci. and Technol., to be published, incorporated herein by reference.

Obviously many modifications and variations of the present invention are possible in light of the above teaching. It is therefore to be understood that, within the scope of the appended claims, the invention may be practiced otherwise than as specifically described.

What is claimed and desired to be secured by Letters Patent of the United States is:

1. A method of separating xenon from a mixture comprising xenon and krypton, the steps of which comprise:
   selecting a light source;
   irradiating a gaseous mixture comprising xenon, krypton and fluorine with light from said light source at a wavelength of 250–370 nm to form crystals of XeF$_2$;
   decomposing said crystals of XeF$_2$ to form xenon and fluorine gas;
   isolating xenon.

2. The method of claim 1 wherein said irradiation step is performed at about $-120°$ C. to 20° C.

3. The method of claim 1 wherein the amount of fluorine present in said gaseous mixture is in excess of the amount of fluorine required to stoichiometrically react with all of said xenon present in said gaseous mixture to form XeF$_2$.

4. The method of claim 3 wherein the amount of fluorine present in said gaseous mixture is about 110–150 mole percent of the amount of fluorine required to react with all of the xenon present in said gaseous mixture to form XeF$_2$.

5. The method of claim 4 wherein said irradiation step comprises the step of selecting a photolysis cell comprising at least one window through which light having a wavelength of 250–370 nm can pass.

6. The process of claim 5 wherein said step of selecting said photolysis cell comprises the step of selecting a photolysis cell comprising at least one salt window.

7. The process of claim 5 wherein said step of selecting said photolysis cell comprises the step of selecting a photolysis cell comprising at least one salt window comprising a fluoride salt.

8. The process of claim 7 wherein said irradiation step is performed at between about 200 torr and 1 atmosphere.

9. The process of claim 3 wherein said irradiation step comprises the step of irradiating said gaseous mixture comprising xenon, krypton and fluorine at 250–350 nm.

10. The process of claim 3 further comprising the step of isolating krypton from said irradiated gaseous mixture after isolating said crystals of $XeF_2$.

11. The process of claim 3 wherein said step of selecting a light source comprises the step of selecting a light source comprising a laser.

12. The process of claim 11 wherein the step of selecting a light source comprises the step of selecting a light source comprising a continuous laser.

13. The process of claim 11 wherein the step of selecting a light source comprises the step of selecting a light source comprising a pulsed laser.

14. The process of claim 3 wherein the step of selecting a light source comprises the step of selecting a light source comprising a mercury lamp.

15. The process of claim 3 wherein said gaseous mixture is flowed past and irradiated by said light source.

16. The process of claim 15 wherein said step of selecting a light source comprises the step of selecting a light source comprising a laser.

17. The process of claim 16 wherein the step of selecting a light source comprises the step of selecting a light source comprising a continuous laser.

18. The process of claim 16 wherein the step of selecting a light source comprises the step of selecting a light source comprising a mercury lamp.

19. A method of separating xenon from a mixture comprising xenon and krypton, the steps of which comprise:
   selecting a gaseous mixture comprising xenon, krypton and fluorine wherein the amount of fluorine present in said gaseous mixture is about 110 to 250 mole percent of that necessary to react stoichiometrically with said xenon present in said gaseous mixture to form $XeF_2$;
   selecting a photolysis cell having at least one salt window comprising a fluoride salt;
   admitting said gaseous mixture into said photolysis cell;
   irradiating said gaseous mixture in said photolysis cell with light having a wavelength of 250–350 nm at about 200 torr to one atmosphere and $-120°$ C. to 20° C. to form crystals of $XeF_2$;
   decomposing said crystals of $XeF_2$ to form xenon and fluorine gas;
   isolating xenon.

20. A method of separating xenon from a mixture comprising xenon and krypton, the steps of which comprise:
   selecting a gaseous mixture comprising xenon, krypton and fluorine wherein the amount of fluorine present in said gaseous mixture is about 110 to 150 mole percent of that necessary to react stoichiometrically with said xenon present in said gaseous mixture to form $XeF_2$;
   selecting a photolysis cell having at least one salt window comprising a fluoride salt;
   admitting said gaseous mixture into said photolysis cell;
   irradiating said gaseous mixture in said photolysis cell with light having a wavelength of 250–350 nm at about 200 torr to one atmosphere and $-120°$ C. to 20° C. to form crystals of $XeF_2$;
   decomposing said crystals of $XeF_2$ to form xenon and fluorine gas;
   isolating xenon;
   isolating krypton.

* * * * *